US011253098B2

(12) United States Patent
Dion et al.

(10) Patent No.: US 11,253,098 B2
(45) Date of Patent: Feb. 22, 2022

(54) HOT-DOG STEAMER SYSTEM

(71) Applicant: LES PROMOTIONS ATLANTIQUES INC., Longueuil (CA)

(72) Inventors: Patrick Dion, Montreal (CA); Mason Ho, Saint-Laurent (CA)

(73) Assignee: LES PROMOTIONS ATLANTIQUES INC., Québec (CA)

( * ) Notice: Subject to any disclaimer, the term of this patent is extended or adjusted under 35 U.S.C. 154(b) by 358 days.

(21) Appl. No.: 16/356,793

(22) Filed: Mar. 18, 2019

(65) Prior Publication Data

US 2019/0282021 A1 Sep. 19, 2019

Related U.S. Application Data

(60) Provisional application No. 62/643,984, filed on Mar. 16, 2018.

(51) Int. Cl.
*A47J 27/16* (2006.01)
*F24C 7/00* (2006.01)

(52) U.S. Cl.
CPC ............. *A47J 27/16* (2013.01); *F24C 7/006* (2013.01)

(58) Field of Classification Search
CPC ............ A47J 27/16; A47J 27/05; F24C 7/006
USPC ...................... 126/348, 369, 369.2; 99/417
See application file for complete search history.

(56) References Cited

U.S. PATENT DOCUMENTS

| 691,380 | A | | 1/1902 | Hower | |
|---|---|---|---|---|---|
| 998,096 | A | | 7/1911 | Hutchings | |
| 4,648,382 | A | * | 3/1987 | Greenbacker | A47J 27/04 126/268 |
| 2004/0112372 | A1 | * | 6/2004 | Dumoux | A47J 27/05 126/369 |
| 2010/0024666 | A1 | * | 2/2010 | Lee | A47J 27/084 99/473 |
| 2013/0126514 | A1 | * | 5/2013 | Cheung | A47J 27/04 219/401 |

* cited by examiner

*Primary Examiner* — Vivek K Shirsat
(74) *Attorney, Agent, or Firm* — Merchant & Gould P.C.

(57) ABSTRACT

A steaming system is for steaming food. The steaming system including a base component adapted for receiving fluid therein, the base component being adapted to cooperate with a steam generating apparatus configured to heat up said fluid to produce steam. The steaming system also includes at least one steaming component includes a steaming compartment adapted to contain food to be steamed, the at least one steaming component being operatively mounted on the base component and being in fluid communication therewith. The steaming system is operable in a steaming configuration where the components are stacked onto one another to allow circulation of steam from the base component to the steaming compartment. The steaming system is further operable in a storage configuration where the base component is contained within the steaming compartment.

10 Claims, 10 Drawing Sheets

HOT-DOG STEAMER SYSTEM

This application claims benefit of U.S. Patent Ser. No. 62/643,984, filed 16 Mar. 2018 and which application is incorporated herein by reference. To the extent appropriate, a claim of priority is made to the above disclosed application.

FIELD OF THE INVENTION

The present invention relates to a steamer system, and more particularly a steamer system used for steaming food, such as hot-dogs for example, and the like.

BACKGROUND OF THE INVENTION

Steaming devices and appliances having various accessories used in cooking applications are well known in the art.

For example, steaming pots, or stackable saucepans, are widely used cooking equipment consisting mainly of two pots closed off by a lid. First, the bottom pot is filled with water and placed on a stove-top to bring the water to a boil. A second pot is placed on top of the first one and is usually provided with a plurality of holes to let steam produced from the boiling water pass therethrough to cook food contained within the second pot. Many drawbacks emerged from the use of such steaming pots such as the restriction of use with a stove-top, and the requirement of a large storage space among others. Being restricted to boiling water on top of a stove forces a user to use said steaming pots in a kitchen and dramatically reduces their reliability in other environments.

The Applicant is aware of U.S. Pat. No. 691,380 granted on Jan. 21, 1902, to HOWER, relating to a "steam cooker". Namely, this document describes a steam cooking apparatus whose parts are adapted to be separated and packed or nested in the main or water section for compactness in shipping and storage and which shall be able of easy erection. However, the steam cooker described is still restricted to boiling water by resting on a stove.

Also known to the Applicant is U.S. Pat. No. 998,096 granted on Jul. 18, 1911, to HUTCHINGS, and relating to a "steam-cooker". Namely, this document describes an apparatus for cooking or steaming foods or the like and has for its object to provide an improved device whereby several articles of food may be cooked at the same time in separate compartments without one article being contaminated by the flavor or odor of the other or others. The device comprises many containers arranged one above the other upon a saucepan, boiler or the like and has a mean whereby the steam from said saucepan may be admitted to each or all the food containers or compartments at will.

Also known to the Applicant is U.S. patent application Ser. No. 10/730,893 published on Jun. 24, 2004, to DUMOUX et al., and relating to a "steam cooker having a reduced size". Namely, this document describes a steam cooker composed of at least one cooking element having a peripheral lateral wall and a pedestal having a steam production base. The at least one cooking element and the pedestal are constructed and dimensioned to allow the at least one cooking element to be placed in either an upright position on the pedestal to hold a food being cooked or in an inverted position on the pedestal so that the peripheral lateral wall at least partially envelopes the pedestal.

Despite these known improvements, there is always a need to continue innovating and finding better and/or different ways of steaming food in various applications, in a more efficient, more precise, more accurate, more reliable, more adjustable, more versatile, more adaptable, more impactful, and/or more desirable manner (ex. depending on the circumstances, and the intended results, etc.).

Thus, it would be particularly useful to be able to provide a new steaming system which, by virtue of its design and components, would be able to overcome or at least minimize some of the known drawbacks associated with conventional steamers, for example.

SUMMARY OF THE INVENTION

An object of the present invention is to provide a steaming system which, by virtue of its design and components, is intended to satisfy the above-mentioned need and which is thus an improvement over other related steaming systems, corresponding associated accessories and/or steaming devices, assemblies and/or methods known in the prior art.

In accordance with the present invention, the above main object is achieved, as will be easily understood, with a steaming system such as the one(s) briefly described herein and such as the one exemplified and/or alluded to in the accompanying drawings.

More particularly, according to one aspect of the present invention, there is provided a steaming system for steaming food, the steaming system comprising:

a base component adapted for receiving fluid therein, the base component being adapted to cooperate with a steam generating apparatus configured to heat up said fluid to produce corresponding steam; and At least one steaming component comprising a steaming compartment configured to contain the food to be steamed, said at least one steaming component being operatively mountable on the base component;

the steaming system being operable in a steaming configuration where the components of the steaming system are assembled onto one another so that the at least one steaming component has an interface being in fluid communication with the base component to allow the passage of steam from the base component into the steaming compartment, the steaming system being further operable in a storage configuration where the components of the steaming system are disassembled from one another and where the base component is contained within said steaming compartment of the at least one steaming component.

As will be explained in greater detail hereinbelow, the present system is particularly advantageous in that, due to its components and features, it enables, or at the very least, it aims, to reduce manipulations and manipulation time for assembling a steamer system, reduce storage space required for such systems, reduce operation time of steaming food for consumption; and many more which will become obvious as explained hereinbelow.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions (expressed in inches, and/or centimeters, for example) shown in the figures and/or described herein, are preferred, for exemplification purposes only.

Moreover, although the present invention was primarily designed as a steaming system for steaming food, such as hot-dog sausages and/or hot-dog buns, and the like, for example, it may be used for various other types of applications, and with various other types of objects (i.e., foods), as apparent to a person skilled in the art. For this reason, expressions such as "steaming", "cooking", "heating", "boiling", etc., used herein should not be taken as to limit the scope of the present invention and include all other kinds of objects or fields with which the present invention could be used and may be useful, as apparent to a person skilled in the art.

Moreover, in the context of the present invention, the expressions "device", "apparatus", "assembly", "system", etc., as well as any other equivalent expressions and/or compound words thereof known in the art can/will be used interchangeably, as apparent to a person skilled in the art. This applies also for any other mutually equivalent expressions, such as, for example: a) "steaming container", "steaming component", "steaming vessel", "steaming pot", "steaming tub", "steaming enclosure", etc.; b) "compartment", "chamber", "booth", "area", "cell", "portion", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that expressions such as "connected" and "connectable", or "mounted" and "mountable", may be interchangeable, in that the present invention also relates to a kit with corresponding components for assembling a resulting fully assembled and operational steaming system for use with various types of foods.

Moreover, components of the steaming system, associated accessory(ies)/component(s)/part(s) thereof and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the preferred embodiment of the present invention as illustrated in the accompanying drawings may comprise various components, and although the preferred embodiments of the steaming system, accessory(ies), component(s), part(s) and/or associated method(s) (ex. manufacturing, assembling, operating, use, etc.) may consist of certain preferred steps and components as explained herein, not all of these steps and components are essential to the invention and thus should not be taken in their restrictive sense, i.e. should not be taken as to limit the scope of the present invention. It is to be understood, as apparent to a person skilled in the art, that other suitable steps, components and cooperation therebetween, may be used for the present steaming system (as well as corresponding components thereof, etc.) and corresponding method(s) (of manufacturing, assembling, operating and/or use, etc.) according to the present invention, as will be briefly explained hereinafter and as can be easily inferred herefrom by a person skilled in the art, without departing from the scope of the invention.

LIST OF NUMERICAL REFERENCES FOR SOME OF THE CORRESPONDING POSSIBLE COMPONENTS ILLUSTRATED IN THE ACCOMPANYING DRAWINGS 1. steaming system
3. base component
3a. housing
3b. housing interior
4. support plate
5. steam generating apparatus
6. heating element
7. steaming components
8. steaming compartment
9. bottom surface of steaming component
11. openings in steaming component
13. complementary steaming component
15. main steaming component
17. removable lid
19. lid fastening mechanism
21. locking clip
23. lid top handle
27. adjustable timer
29. base handle
31. water level indicator
33. water refill spout
34. access mechanism
35. access door
37. access tray
39. removable tray

50. steaming configuration of the steaming system

60. storage configuration of the steaming system

Broadly described, the present invention, as illustrated in the accompanying drawings, relates to a steaming system to be used in order to steam a variety of foods, the system can comprise components mountable onto a steam-generating base to effectively steam the food.

Figure 1A:
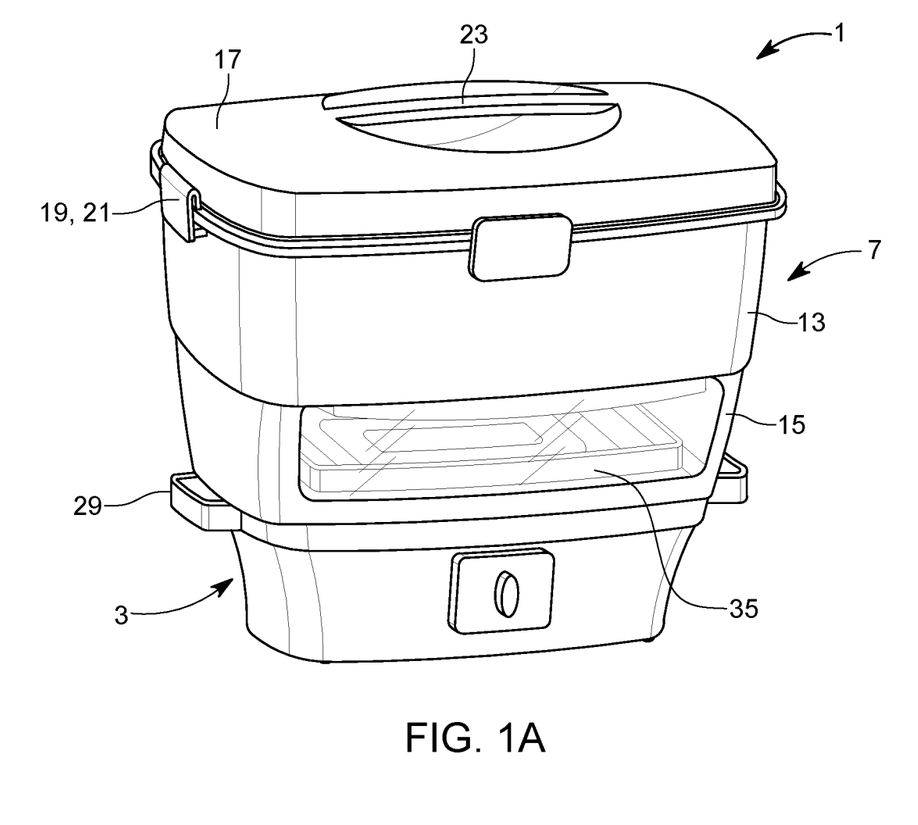
FIG. 1a is a front perspective view of a steamer system according to a possible embodiment of the present system.
Figure 1B:
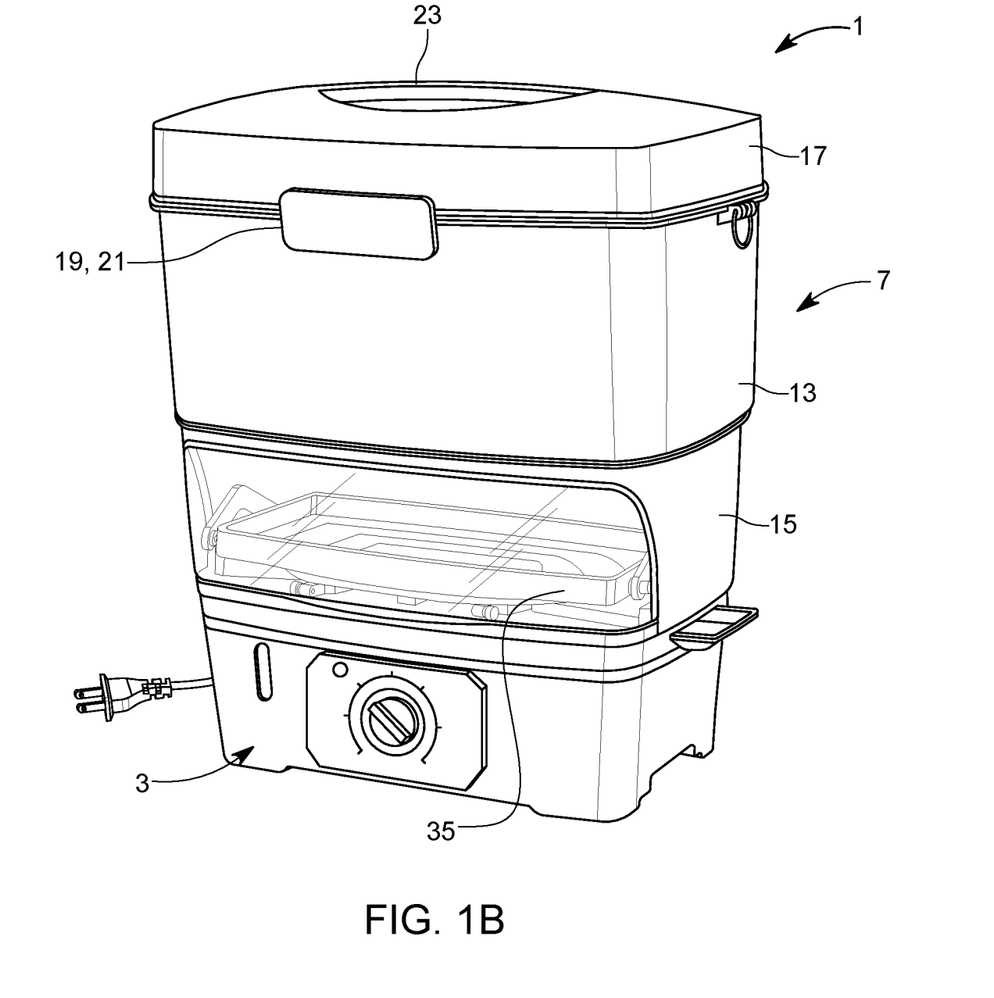
FIG. 1b is a front perspective view of a steamer system according to another possible embodiment of the present system.

Referring to FIGS. 1a and 1b, a steaming system according to possible embodiments of the present invention is provided. The steaming system illustratively comprises a base component adapted for receiving fluid therein, such as water or other similar and/or suitable fluids used for steaming food, and a plurality of components stacked thereon in a manner that will be described hereinbelow.

Figure 2:
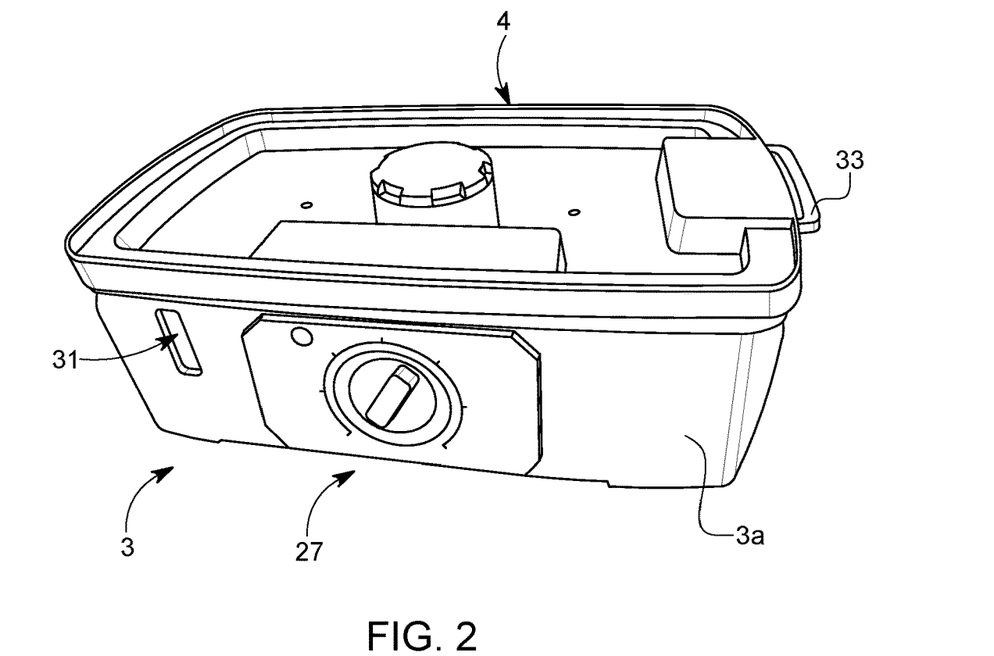
FIGS. 2 and 2a are front perspective view of a base component and support plate according to an embodiment, showing a refill spout in a closed configuration (FIG. 2) and an open configuration (FIG. 2a).
Figure 2A:
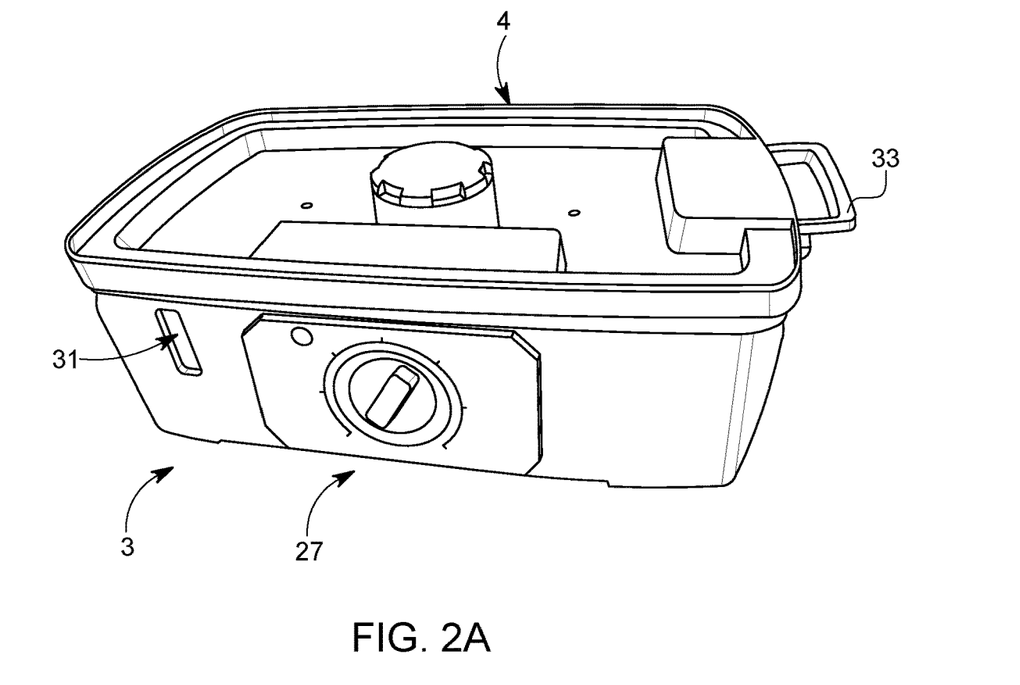
Figure 3:
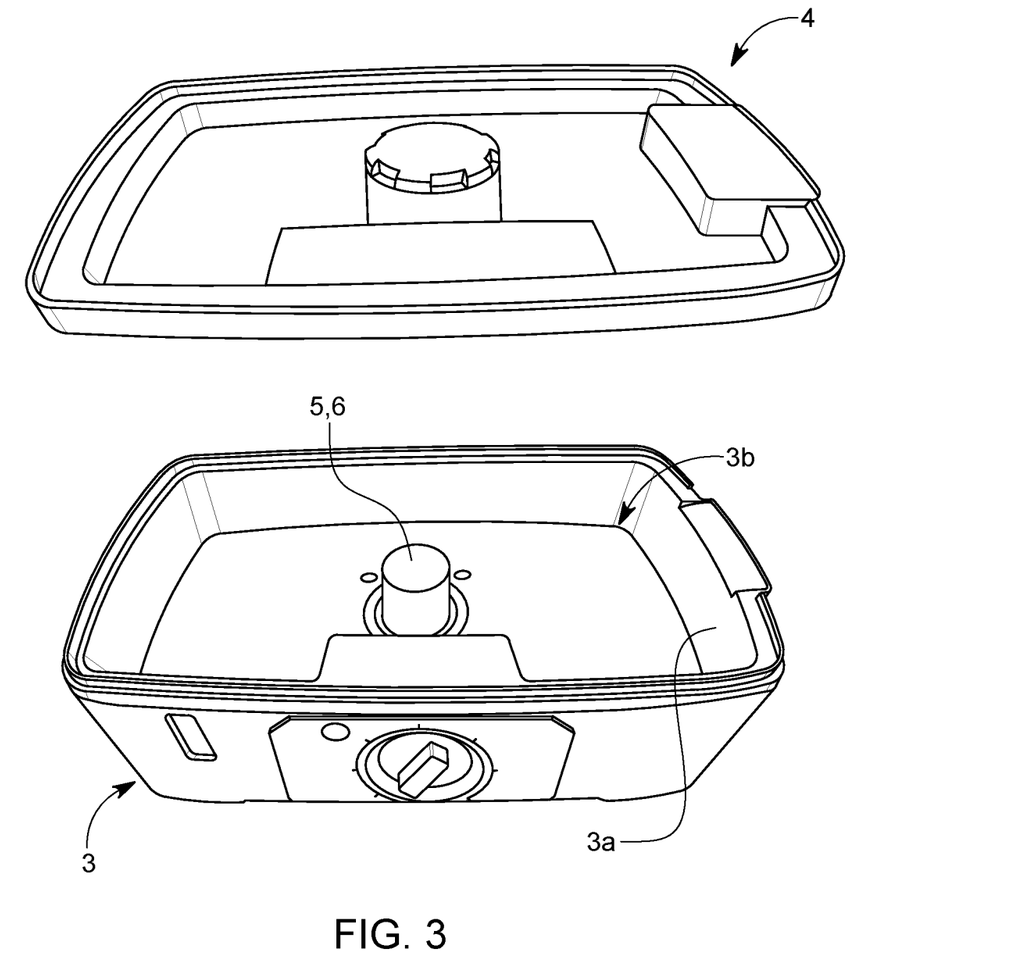
FIG. 3 is an exploded perspective view of a base component and support plate according to an embodiment, showing the interior of the base component.

Now referring to FIGS. 2 to 3, the base component can be configured to cooperate with a steam generating apparatus adapted to heat up the fluid contained within the base component to produce steam. In this embodiment, the base component can include a housing and a support plate removably connected to the housing. More specifically, the housing includes peripheral walls defining a housing interior configured to receive therein the water needed to produce the aforementioned steam. Additionally, the base component can be provided with a water level indicator adapted to provide visual information regarding the level of the water contained within the housing interior without having to disassemble the steaming system. In some embodiments, the water level indicator is a transparent window located on the housing adapted to allow observation of the housing interior from an outside point of view. It should be noted that the transparent window can be provided with markers, such as MIN and/or MAX to facilitate determination of the water level. Alternatively, the water level indicator can be a visual indicator, such as an LED indicator, adapted to light up if the water level is too low. However, it should be understood that any suitable means, methods, or combination thereof, for indicating the water level can also be used.

In some embodiments, the base component can be provided with a pair of handles (FIG. 1a) adapted to facilitate transportation thereof. More specifically, the handles of the base component can be provided on opposite ends of the base component, but can alternatively be provided at any other suitable location. In other embodiments, the steaming system can be adapted to be transported via a shoulder strap connectable to one of the components of the steaming system, therefore facilitating transportation of the system.

Still referring to FIGS. 2 to 3, the support plate can be positioned atop the housing to effectively cover the housing interior. It should be understood that openings can be provided in the support plate to allow steam to exit the housing interior. In the present embodiment, the support plate is provided with a plurality of openings positioned in a circular manner substantially in the center of the support plate. However, other configurations can be suitable regarding the position, number and size of the openings. In some embodiments, the support plate can be provided with a water-fill spout configured to allow water to be provided to the housing interior without having to remove the support plate from the housing. The water-fill spout can include a compartment slidably connected to the support plate and being configured to allow fluid communication with the housing interior. More specifically, the compartment can be operated in a closed configuration (FIG. 2) and/or an open configuration (FIG. 2a). It is noted that the closed position can be adapted to prevent any debris and/or unwanted material from entering and/or mixing with the water contained within the housing interior. It should thus be understood that the open position can allow water to be provided to the housing interior when needed (e.g., when the water level indicator indicates a low water level).

Referring more particularly to FIG. 3, the steam generating apparatus can be integrated within the base component of the steaming system to facilitate cooperation therewith. In some embodiments, the steam generating apparatus includes a heating element adapted to extend within the housing interior to heat the water contained therein. The heating element can be a protrusion extending from a bottom surface of the housing interior, substantially in the center thereof. It should be understood that the plurality of openings of the support plate can be adapted to be positioned substantially above the heating element to facilitate circulation of steam from the housing interior to other components of the steaming system, as will be described further below. Moreover, it is appreciated that other configuration of the heating element can be suitable in the context of the present disclosure. It should be understood that the steam generating apparatus can include more than one heating element cooperating with the base and/or housing interior. In this embodiment, the steam generating apparatus can be selectively operated via an actuator coupled to an adjustable timer located on the housing. It is understood that the adjustable timer can be adapted to control/determine an operation time of the heating element. In this embodiment, the heating element can be manually operated for a predetermined amount of time (e.g., 1 minute, 5 minutes, 30 minutes, 1 hour, etc.).

Figure 4A:
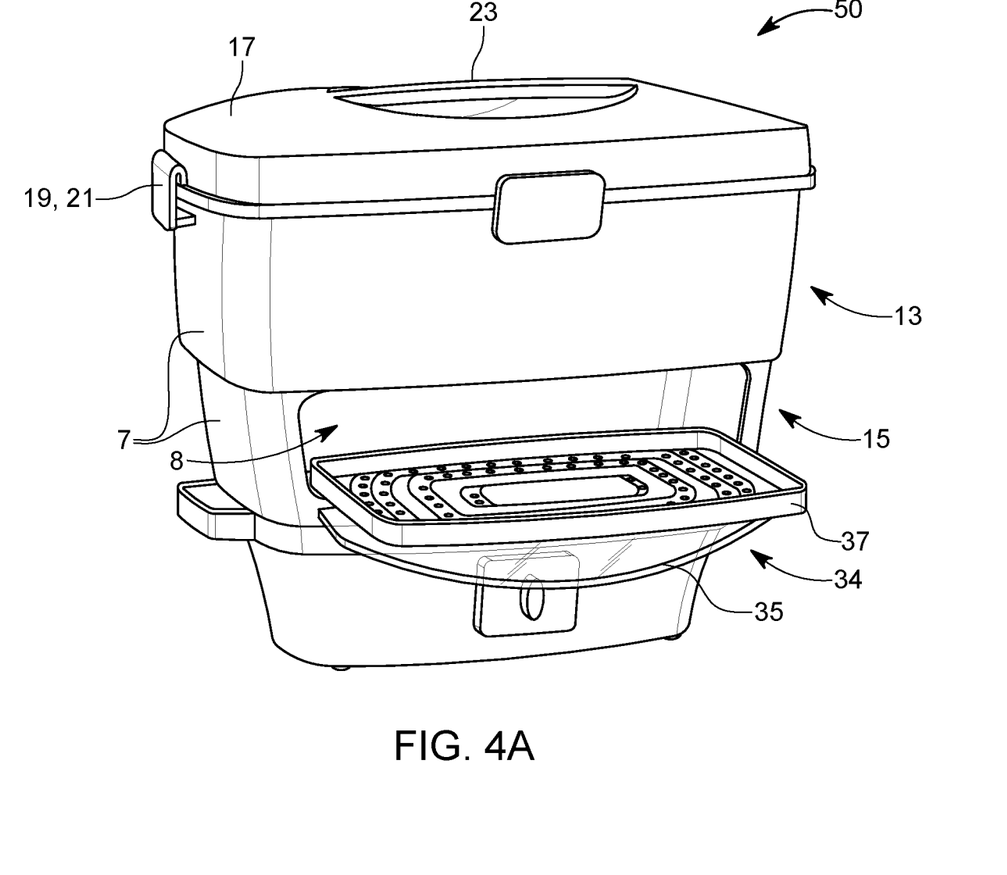
FIG. 4a is a front perspective view of the steamer system shown in FIG. 1a with an access door in an open configuration according to a possible embodiment.
Figure 4B:
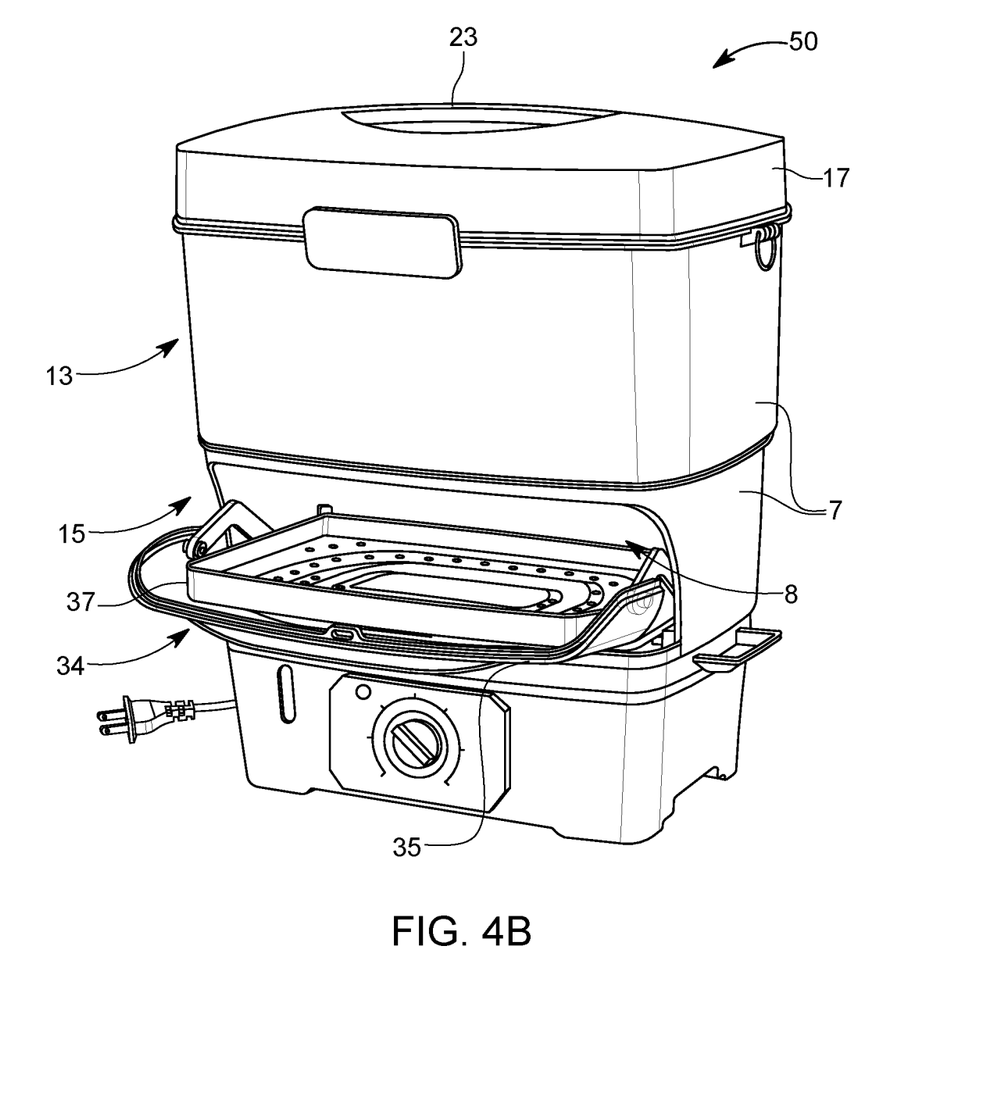
FIG. 4b is a front perspective view of the steamer system shown in FIG. 1b with an access door in an open configuration according to a possible embodiment.

Now referring to FIGS. 4a and 4b, in addition to FIGS. 1a and 1b, the steaming system can further comprise a steaming component adapted for containing food to be steamed. In some embodiments, the steaming component is operatively mountable to the base component and is provided with a steaming compartment which can be shaped and sized to contain a variety of food products (i.e. hot dogs, vegetables, etc.). More specifically, the steaming component has a bottom surface mountable on the support plate in order to be stacked on the base component. It is appreciated that the support plate can be provided with a flange (FIG. 2) extending around a periphery thereof to allow the steaming component to rest thereon. In the present embodiment, the steaming system comprises two steaming components mountable on the base component, but can alternatively comprise a single steaming component, three steaming components, or any suitable number thereof.

Figure 5:
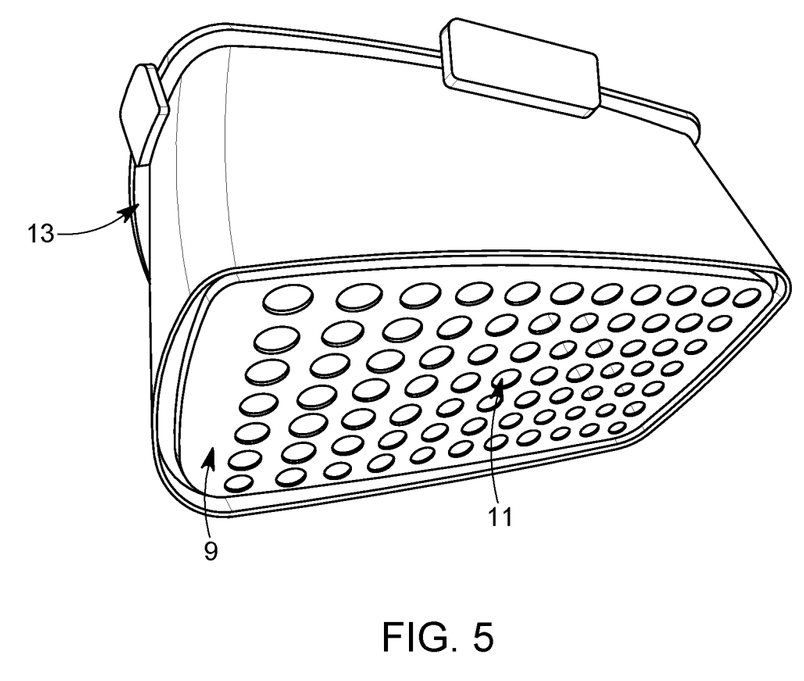
FIG. 5 is a bottom perspective view of a steaming component according to an embodiment, showing a plurality of openings located on the bottom surface thereof.
Figure 6A:
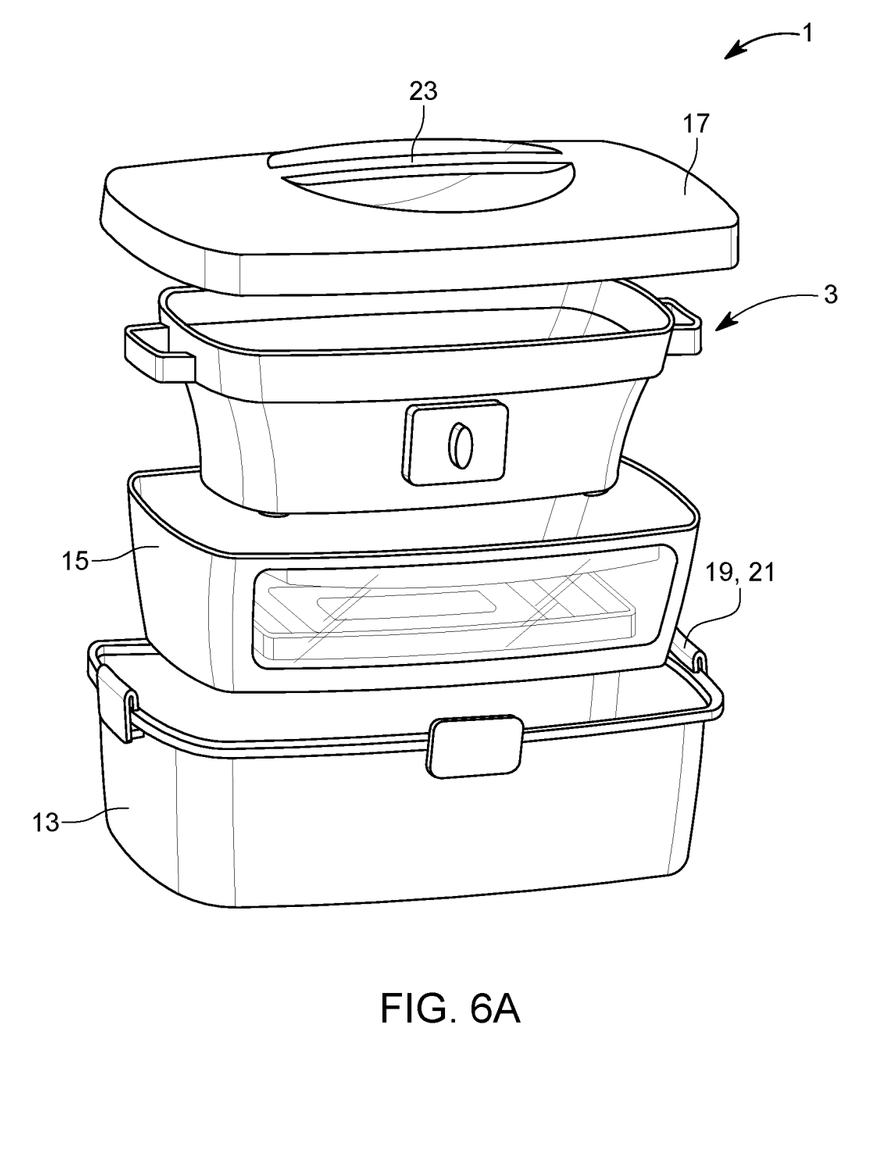
FIG. 6a is an exploded view of the steamer system shown in FIG. 1a with components arranged in increasing size from top to bottom.
Figure 6B:
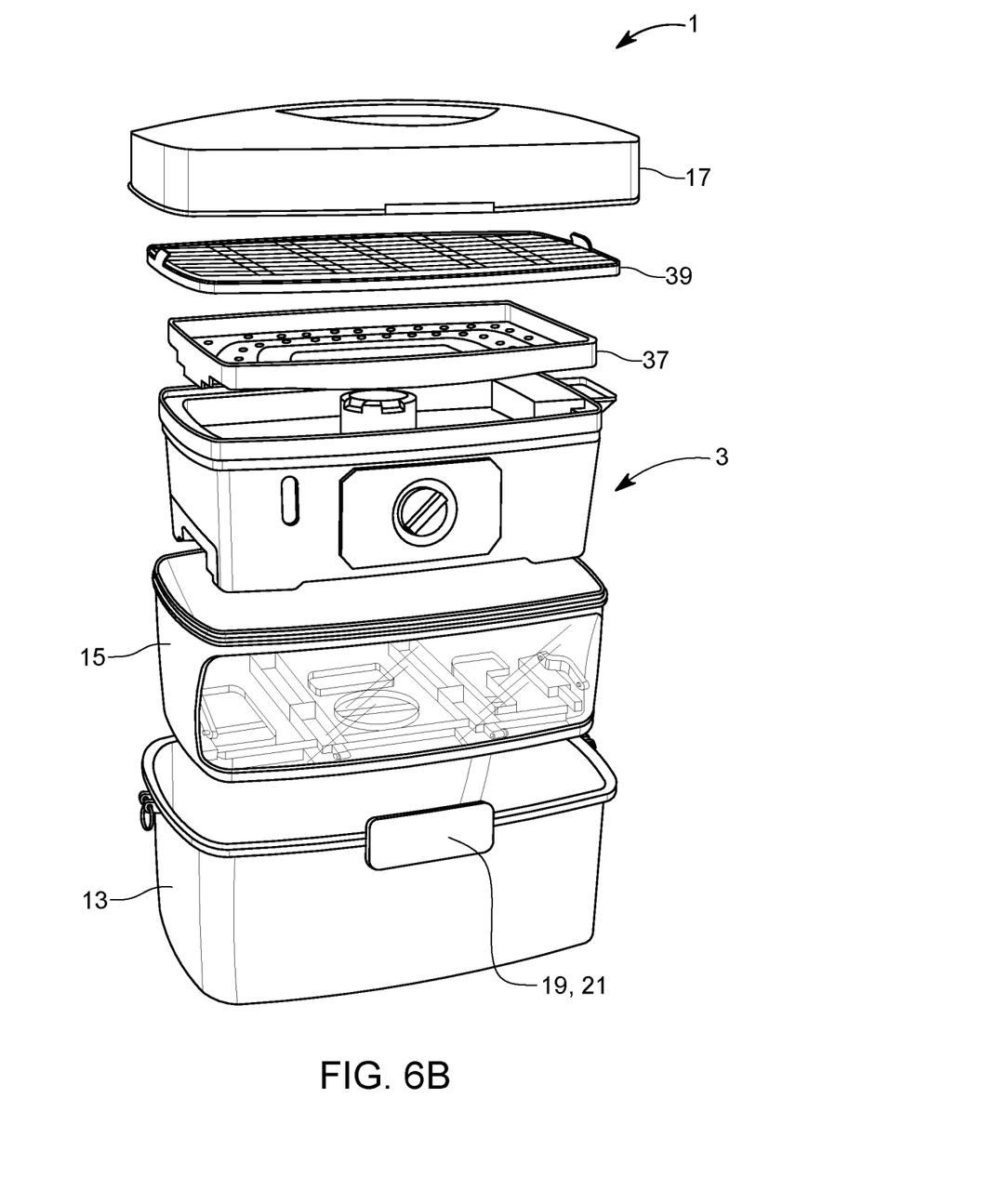
FIG. 6b is an exploded view of the steamer system shown in FIG. 1b with components arranged in increasing size from top to bottom.
Figure 7A:
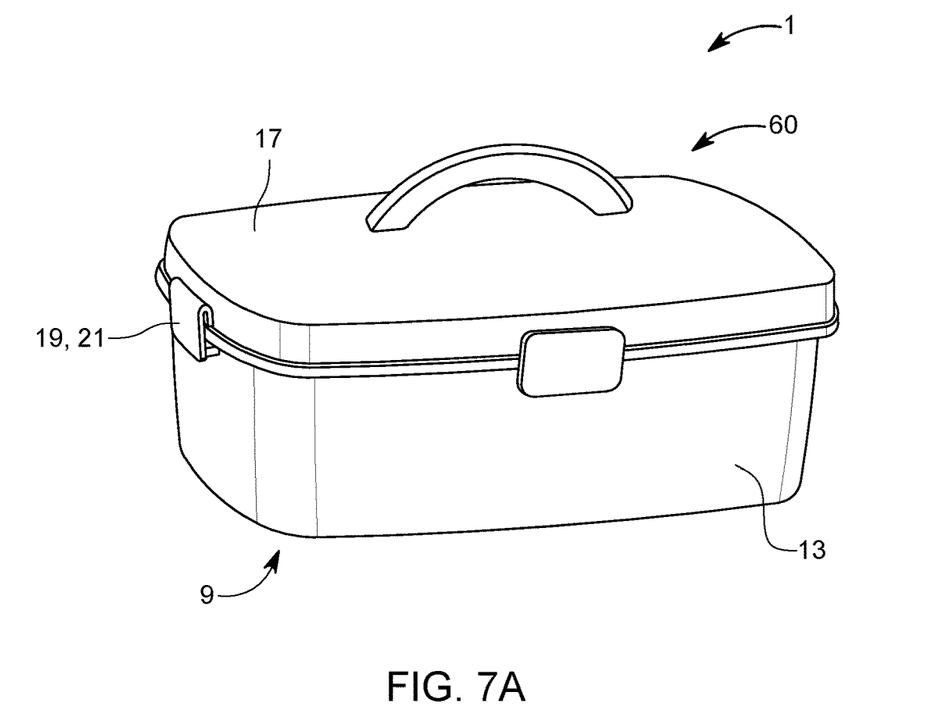
FIG. 7a is a front perspective view of the steamer system shown in FIG. 1a arranged in a storage configuration according to a possible embodiment of the present system.
Figure 7B:
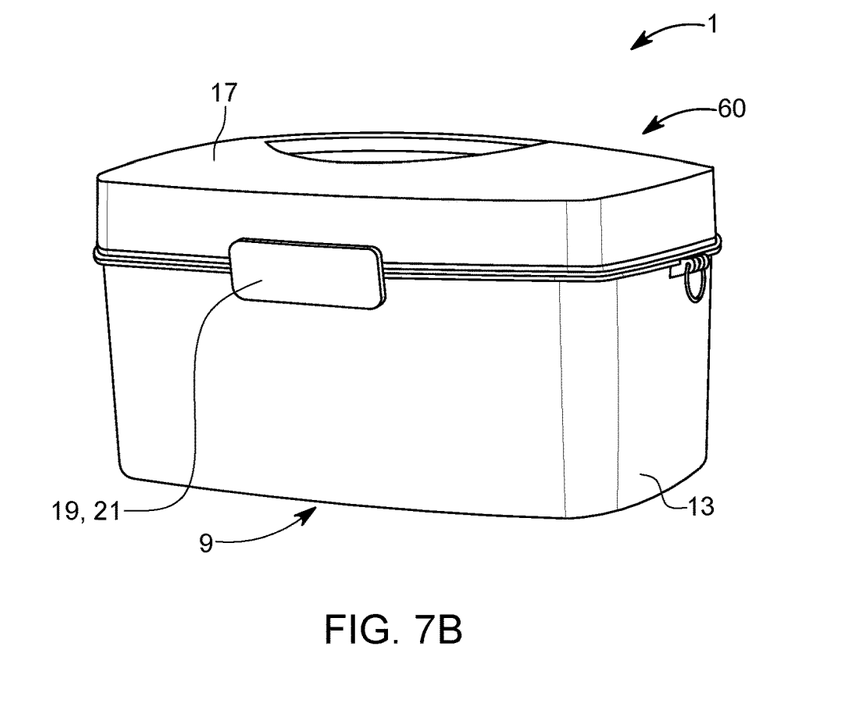
FIG. 7b is a front perspective view of the steamer system shown in FIG. 1b arranged in a storage configuration according to a possible embodiment of the present system.

As illustrated in FIGS. 1a and 1b, the steaming system can be operated in a steaming configuration where the steaming components are assembled (i.e., stacked on the base component) and adapted to be in direct, or indirect fluid communication with the base component, effectively allowing steam to circulate within each steaming compartment. As seen in FIG. 5, the bottom surface of the steaming components can be provided with one or more openings to allow circulation of steam. It should thus be understood that the steam can circulate within the steaming system (i.e., from the base component to the steaming components) from within, reducing loss of steam and heat. In some embodiments, the steaming components can include a main steaming component and at least one complementary steaming component. The main steaming component can be mounted on the base component, as described above, and the complementary steaming component can be adapted to be mounted on the main steaming component in a similar manner.

In some embodiments, the complementary steaming component can be provided with a removable lid adapted to prevent the steam from escaping. In this embodiment, the lid can be securely fastened to the corresponding steaming component via a fastening mechanism. As illustrated in the accompanying figures, the complementary steaming component can be provided with a plurality of locking clips adapted to effectively lock the lid in place when engaged. Alternatively, the locking clips can be provided directly on the removable lid to effectively engage the steaming component to secure the lid thereto. Other fastening and/or locking mechanisms can be used in order to fasten the lid to the steaming component, such as a sliding bolt, complementary protrusions and apertures, or any other suitable locking/fastening mechanisms. In the present embodiment, the removable lid can be provided with a top handle to facilitate transportation of the corresponding component. In some embodiments, the top handle can be operable in a retracted position and/or an extended position to accommodate a variety of situations.

Still referring to FIGS. 4a and 4b, the steaming components can be provided with an access mechanism adapted to effectively allow access to the steaming compartment while the steaming components are stacked on the base (i.e., the steaming system is in the steaming configuration). In some embodiments, the access mechanism can be an access door provided on a sidewall of one of the steaming components. The access door can be opened while the steaming system is in the steaming configuration, thus allowing access to the food contained within the corresponding steaming compartment. The access door can be made from a clear material configured to allow observation of the food from the outside without having to open the access door or disassembling the steaming system.

In some embodiments, the access mechanism can further include an access tray operatively connected to the access door, configured to facilitate access to the contents of the steaming compartment. In some embodiments, the access tray can be configured to slide out of the steaming compartment when the access door is opened to separate the contents of the steaming compartment from the steam. It should thus be appreciated that the access tray can allow food (or other contents) to be provided to, or taken from, the steaming compartment without having to disassemble the steaming system. In a possible embodiment, the access tray can be configured to slide out of the access door simultaneously as the access door is opened, therefore allowing access to the contents of the access tray in a single operation. For example, the access door can be provided with slidable hinges connected at one end to the access door, and at the other end to the access tray. As such, when the door pivots about the hinges at one end, the other end simultaneously slides forward, effectively displacing the access tray. In some embodiments, the access tray can be removable from the steaming component to facilitate transportation of the food located thereon. In the present embodiment, the main steaming component is provided with the access mechanism, as described above, and the complementary component is simply provided with a removable tray for facilitating removal of the contents. However, it should be appreciated that the complementary steaming component can be provided with the access mechanism instead, or that each steaming component can be respectively provided with the access mechanism.

Now referring to FIGS. 6a through 7b, the steaming system can be further operated in a storage configuration where the components are disassembled and stored within one another. In some embodiments, each component of the steaming system can be smaller in size than the component stacked above it in the steaming configuration. More specifically, the base component can be smaller than the main steaming component, which is in turn smaller than the complementary steaming component. As such, when in the storage configuration, the components can be nested within each other for a more compact storage. More specifically, the base component is nestable within the main steaming component, and the main steaming component is nestable within the complementary steaming component. The removable lid can be fastened to the complementary steaming component when the steaming system is in the storage configuration to facilitate transportation and storage thereof.

While operating the steaming system, the bottom surface of the base component can rest on a working surface, such as a table or counter. As such, debris such as dust and/or dirt can gather on the bottom surface which can then be transferred within the steaming components when storing the system. In some embodiments, to prevent the dirt and dust from being transferred to the steaming components, the handles of the base component can be adapted to abut against a top periphery of the main steaming component, therefore preventing direct contact between the bottom surface the interior of the steaming components.

As mentioned above, the steaming system can be adapted for steaming a variety of food, but is preferably adapted for steaming hot-dog sausages and hot-dog buns. More specifically, the main steaming component can be adapted to steam hot-dog sausages while the complementary steaming component, being larger than the main steaming component, can be adapted to steam hot-dog buns. Furthermore, it can be preferable to steam the buns in the uppermost (complementary) steaming component, further away from the source of the steam, in order to avoid "over-steaming" the buns, making them soggy, for example.

In this embodiment, when in the steaming configuration, the system can have an overall height between about 0.2 and about 0.6 m but preferably about 0.395 m, an overall length between about 0.2 and about 0.6 m but preferably about 0.375 m, and an overall width between about 0.15 and about 0.4 meters but preferably about 0.25 m. Furthermore, when in the storage configuration, the system can have an overall height between about 0.1 and about 0.4 m but preferably about 0.2 m, an overall length between about 0.2 and about 0.6 m but preferably about 0.375 m, and an overall width between about 0.15 and about 0.4 meters but preferably about 0.25 m. Being of smaller size in the storage configuration effectively facilitates storage, but also facilitates transportation of the steaming system.

Furthermore, it should be understood that the steaming components of the steaming system are made from a heat resistant material, preferably a polymer/plastic material. It should also be understood that said material is a material suitable to contact food. As such, in order to clean the components after use, any suitable soap can be used, or alternatively, the steaming components can be washed in a dishwasher.

Finally, the steaming system can be an electrical steaming system. More specifically, the heating element of the steam generating apparatus can be electrically powered using a power chord plugged into a socket, as is well known in the art. Alternatively, power can be provided to the heating element via other methods, such as solar power, integrated battery(ies), manpower (turning a crank to power a generator, for example), or any other suitable and/or methods.

As may now better be appreciated, the present invention is a substantial improvement over the known prior art in that, by virtue of its design and components, as explained herein, and the particular configuration of the steaming system and/or component(s)/accessory(ies) thereof according to the present system, it enables to carry out steaming operations of a variety of foods, especially, hot dogs (i.e. sausages and buns, etc.) in a more efficient, more precise, more accurate, more reliable, more adjustable, more versatile, more adaptable, more impactful, more strategic, and/or more desirable manner (ex. depending on the circumstances, and the intended results, etc.), compared to what is possible with respect to other known conventional steaming systems and/or methods.

Indeed, as previously explained, and depending on the different possible embodiments, the present system advantageously enables to a) manufacture a steaming system capable of being operated in several configurations, including a compact storage configuration; b) add and remove food from within the steaming compartments without having to disassemble the steamer system; c) be operable without the use of a stove for boiling water into steam; and d) reduce manipulation time to convert the steamer system from the storage configuration to an operational, or steaming configuration.

Of course, and as can be easily understood by a person skilled in the art, the scope of the present invention should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as apparent to a person skilled in the art.

The invention claimed is:

1. A steaming system for steaming food, the steaming system comprising:
 a base component adapted for receiving fluid therein, the base component being adapted to cooperate with a steam generating apparatus configured to heat said fluid to produce steam;
 at least one steaming component comprising a steaming compartment adapted to contain food to be steamed, the at least one steaming component being operatively mounted on the base component and being in fluid communication with the base component;
 the steaming system being operable in a steaming configuration where the components are stacked onto one another to allow circulation of steam from the base component to the steaming compartment, the steaming system being further operable in a storage configuration wherein the base component is contained within the steaming compartment;
 wherein the at least one steaming component comprises a bottom surface having at least one opening to allow circulation of steam therethrough;
 wherein the base component comprises a support plate adapted to support the at least one steaming component;
 wherein the at least one steaming component is provided with a removable lid;
 wherein the removable lid comprises a fastening mechanism adapted to secure the lid to the at least one steaming component wherein the fastening mechanism comprises at least one locking clip; wherein the removable lid is provided with a top handle; and wherein the top handle is operable between a retracted configuration and an extended configuration;
 wherein the steam generating apparatus is integrated within the base component and comprises at least one heating element;
 wherein the steaming system comprises an actuator for operating the heating element and wherein the actuator is an adjustable timer;
 wherein the base component is provided with at least one handle to facilitate transportation of the base component;
 wherein the base component is provided with a water level indicator;
 wherein the steaming system comprises at least one refill spout adapted to allow fluid to be provided to the base component while the steaming system is in the steaming configuration; wherein the refill spout comprises a slidable compartment operable in an open and closed configuration; and wherein the refill spout is positioned on the support plate;
 wherein the at least one steaming component has an access mechanism adapted to allow access to the steaming compartment while the steaming system is in the steaming configuration; and
 wherein the access mechanism comprises an access door located on a sidewall of the at least one steaming component wherein the access door is made from a clear material adapted to allow observation of the at least one steaming compartment from outside; wherein the access mechanism further comprises an access tray adapted to slide out of the at least one steaming compartment when the access door is opened; wherein opening the access door simultaneously causes the access tray to slide out of the at least one steaming compartment; and wherein the access tray is removably connected to the steaming system.

2. A steaming system according to claim 1, wherein the at least one steaming component includes a main steaming component and at least one complementary steaming component, wherein when in the steaming configuration the main steaming component is adapted to be operatively mounted on the base component, and the at least one complementary steaming component is adapted to be operatively mounted on the main steaming component.

3. A steaming system according to claim 2, wherein each component of the steaming system is smaller than a component mountable above each component in the steaming configuration.

4. A steaming system according to claim 3, wherein each component of the steaming system is nestable within the component mountable above each component in the steaming configuration.

5. A steaming system according to claim 4, wherein the access mechanism is provided on the main steaming component.

6. A steaming system according to claim 5, wherein the steaming compartment of each steaming component is shaped and sized to contain hot-dog sausages and/or hot-dog buns; and wherein steaming system is adapted to steam and/or cook the sausages and buns simultaneously, in separate steaming components.

7. A steaming system according to claim 6, wherein when in the steaming configuration, the system has an overall height between about 0.2 m and about 0.6 m, an overall length between about 0.2 m and about 0.6 m, and an overall width between about 0.15 m and about 0.4 m; and wherein when in the storage configuration, the system has an overall height between about 0.1 m and about 0.4 m, an overall length between about 0.2 m and about 0.6 m, and an overall width between about 0.15 m and about 0.4 m.

8. A steaming system according to claim 6, wherein each component of the steaming system is made from a heat-resistant polymer/plastic material.

9. A steaming system according to claim 6, wherein the steaming system is an electrically powered steaming system.

10. A steaming system according to claim 6, wherein the steaming system is a portable steaming system.

\* \* \* \* \*